United States Patent
Klotzbach

[15] 3,699,818
[45] Oct. 24, 1972

[54] APPARATUS FOR CONVEYING GLASS PANES THROUGH A PROCESSING PLANT

[72] Inventor: Kurt Klotzbach, Dusseldorf-Rath, Germany

[73] Assignee: SACK Glastechnik GmbH, Dusseldorg-Rath, Germany

[22] Filed: June 4, 1970

[21] Appl. No.: 43,353

[30] Foreign Application Priority Data

June 13, 1969 Germany..........P 19 30 081.3

[52] U.S. Cl. ......................74/37, 74/393, 74/568 FS
[51] Int. Cl. ............................................F16h 19/06
[58] Field of Search............74/37, 79, 567, 568, 393; 101/282; 65/273

[56] References Cited

UNITED STATES PATENTS

| | | | |
|---|---|---|---|
| 3,301,244 | 1/1967 | Renshaw | 74/393 |
| 2,395,803 | 3/1946 | Bruckner et al. | 74/393 |
| 2,590,837 | 4/1952 | Axler | 74/568 |
| 3,025,709 | 3/1962 | Brems | 74/393 |
| 2,103,826 | 12/1937 | Robertson | 74/79 |
| 1,387,173 | 8/1921 | Powell | 74/79 |
| 1,833,607 | 11/1931 | Greenfield | 74/368 |
| 2,345,927 | 4/1944 | Foster | 74/568 |
| 2,597,357 | 5/1952 | McCormick | 322/28 |
| 3,215,042 | 11/1965 | Holley, Jr. | 74/60 |

*Primary Examiner*—William F. O'Dea
*Assistant Examiner*—Wesley S. Ratliff, Jr.
*Attorney*—Singer, Stern and Carlberg

[57] ABSTRACT

Apparatus for producing a jerk-free intermittent conveying motion which proceeds in accordance with a desired law of motion includes an electric motor driving the input of a steplessly variable transmission the output of which drives a crank transmission through a wormgear. A toothed push rod connected to the crank of the crank transmission drives a pinion coupled to drive one of two sprocket wheels carrying an endless chain to which is attached a carriage to be reciprocated. A cam disposed on the shaft of the crank has a control surface which defines the desired law of motion and is followed by a roller carried by one arm of a lever pivoted intermediate its ends. The other arm of the lever is coupled to an adjusting element of the steplessly variable transmission so as to adjust the output speed of such transmission in dependence upon the crank position and in accordance with the desired law of motion.

5 Claims, 5 Drawing Figures

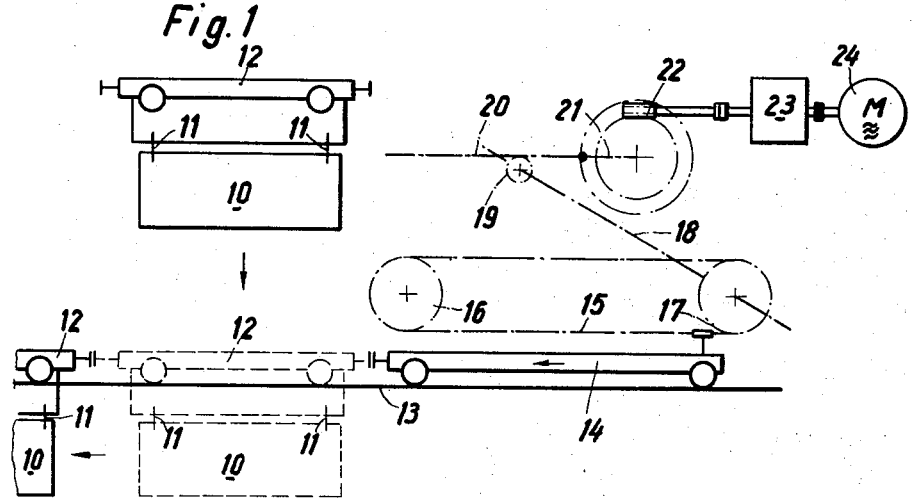
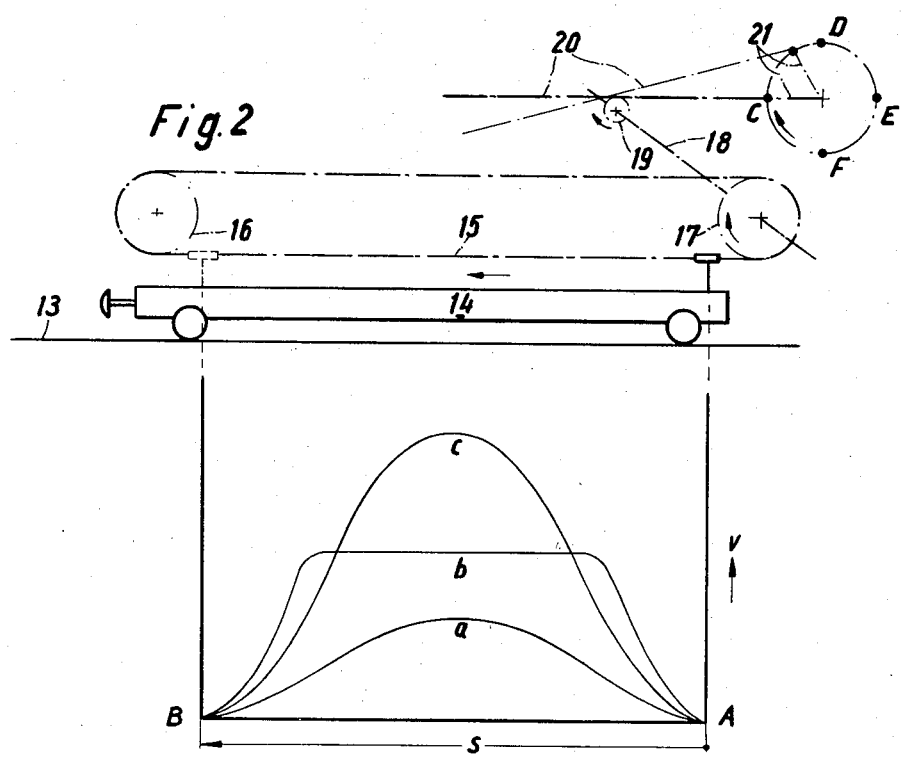

APPARATUS FOR CONVEYING GLASS PANES THROUGH A PROCESSING PLANT

BACKGROUND

The invention relates to apparatus for generating a conveying motion which proceeds in accordance with a desired law of motion.

The invention finds particular application in a conveying system by means of which sheets of glass are conveyed through a tempering furnace. In conveying batches of glass panes suspended on retaining tongs, for example when passing glass panes through a tempering furnace, there is the practical difficulty that the conveying motion causes the panes to oscillate or rock. Under these circumstances it may happen that the panes become detached from the tongs and are broken. Moreover, it is difficult for the bending tools of a bending station adjoining the tempering furnace to align a pane which swings to and fro.

Attempts have therefore been made to prevent the rocking of the panes by conveying apparatus which convey said panes through the tempering furnace in accordance with a velocity characteristic which varies in accordance with the sine function (Federal German Pat No. 1 061 487). Mechanical apparatus which utilizes the motional law of Cardan joints is used to generate the sinusoidal motion. However, it has been shown that this transmission apparatus cannot prevent rocking of the panes. The reason is due to the fact that a velocity characteristic corresponding to the sine function is associated with an acceleration characteristic in accordance with the cosine function. A transmission of the kind heretofore described is therefore not able to move the panes in "shock-free" manner, that is to say increasing steadily from velocity zero and decreasing again, and to move them in "jerk-free" manner, that is to say also from zero without any step in the acceleration curve, because the sinusoidal curve and the cosine curve can never reach zero simultaneously.

The panes are also particularly endangered on being vertically lowered into the tempering furnace because the spikes of the retaining tongs will not yet have impressed themselves into the cold glass panes. Due to the jerky acceleration, the self-retaining tongs are partially relieved of the weight of the panes and the clamping force of the tongs is thus reduced to such an extent that the panes may become detached from the tongs and break.

An irregular acceleration characteristic when the tempered panes are lifted from the furnace and are transported to a bending or quenching station is equally unfavorable because in this case the clamping force of the tongs increases and the tongs penetrate even deeper into the glass which is still soft. These impressions may then be starting points for glass fracture during subsequent tempering or when stresses are applied at a later stage. Moreover, the appearance of undesirable, so-called ears is encouraged by jerky acceleration or deceleration in the vertical direction.

The invention therefore proposes to provide apparatus by means of which impact-free and jerk-free conveying motion can be generated so that oscillations of and damage to the conveyed material can be substantially avoided.

SUMMARY

According to the invention this problem is solved by apparatus to produce an intermittent conveying motion which proceeds in accordance with a desired law of motion for a conveying system, wherein the improvement comprises: a steplessly variable transmission having an input shaft and an output shaft; a motor coupled to drive the input shaft of the steplessly variable transmission; a sliding crank transmission for transmitting drive to the conveying system and coupled to be driven by the output shaft of the steplessly variable transmission; adjusting means in said steplessly variable transmission to adjust the output speed of its output shaft; and control means coupled to the sliding crank transmission and to the adjusting means and operative to effect adjustment of the output speed of the steplessly variable transmission in dependence on the crank position of the sliding crank transmission and in accordance with the desired law of motion.

In this way the specified conveying stroke $s$ is accurately maintained in all cases.

In a preferred embodiment the control means includes cam means disposed on the shaft of the crank of the sliding crank transmission and a cam sensing element coupled to an adjusting element of the steplessly variable transmission, the cam sensing element being disposed on one arm of a lever pivoted intermediate its ends and a linkage coupling the other arm of the lever to the adjusting element of the steplessly variable transmission. This construction of the control means permits simple transmission of the controlling variable to the steplessly variable transmission. Moreover, cams having a control surface or a cam rise curve which corresponds to a desired law of motion can be produced relatively simply on numerically controlled machine tools. In an advantageous further development it is provided that the linkage which couples the double lever to the adjusting element is constructed to be of adjustable length and for the point at which the linkage acts on the said other arm of the lever to be displaceable to vary the effective lever length of said other lever arm. By virtue of this double adjustability it is possible for the starting position of the adjusting element of the steplessly variable transmission to be accurately set and it is also possible for the control deflection of the lever and therefore of the regulating range of the steplessly variable transmission to be varied.

To enable the conveying stroke to be adapted to different requirements it is advisable that the point at which a push rod is pivotally connected to the crank of the sliding crank transmission be displaceable to enable the effective crank length to be varied.

In a preferred further embodiment of the apparatus according to the invention, the control surface of the cam means is formed by a flexible steel band the two ends of which are joined, the curvature along the circumference is adapted to be variable by means of a plurality of adjusting elements, for example adjusting screws. By virtue of the adjustability of its control surface formed by the steel band, it is possible for a cam constructed in this manner to substitute for a plurality of cams otherwise required for different motional laws.

BRIEF DESCRIPTION OF THE DRAWINGS

Other objects and advantages of the invention will be apparent from the following detailed description of a preferred embodiment given with reference to the attached drawings, in which:

FIG. 1 shows diagrammatically the construction of a transmission apparatus of a conveying system for the intermittent conveying of glass panes through a tempering furnace;

FIG. 2 is a partial view, on an enlarged scale, of the transmission apparatus of the conveying system of FIG. 1;

DESCRIPTION OF PARTICULAR EMBODIMENT

Figure 3:
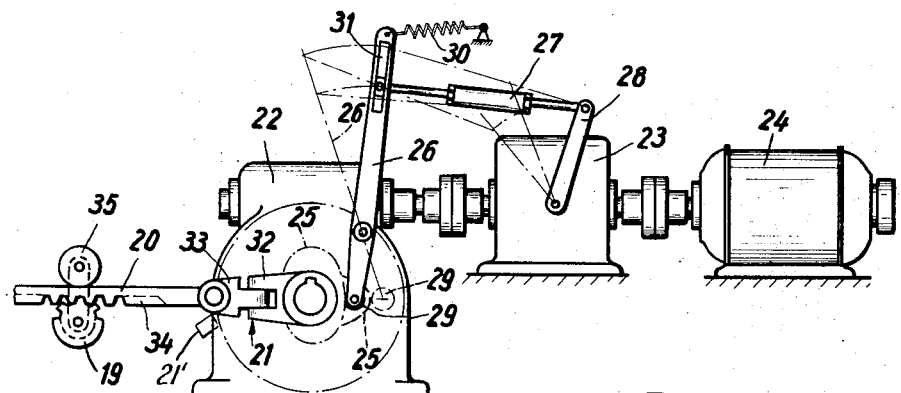
FIG. 3 is a partial side view of the transmission apparatus of the conveying system illustrating control means for the automatic adjustment of the desired law of motion.

The conveying system illustrated in FIG. 1 is provided for the intermittent conveying of glass panes 10 through a tempering furnace in which glass panes are heated to the temperature required for bending or prestressing. The glass panes are suspended from tongs 11 which in turn are mounted on conveying carriages 12. The conveying carriages with the suspended panes are placed from above on to a rail 13 which extends through the tempering furnace and are displaced on the rail (in the drawing to the left) by means of a sliding carriage 14 disposed on an extension of the rail 13. With each conveying stroke s, the sliding carriage 14, driven by an endless chain 15, traverses a distance corresponding approximately to the length of a conveying carriage 12. After the conveying stroke has been performed the sliding carriage 14 is returned and a fresh conveying carriage 12 with suspended pane 10 is inserted into the space between the sliding carriage and the previously displaced conveying carriage. During the next conveying stroke the freshly inserted conveying carriage will be displaced and in turn displace the conveying carriages 12 disposed in front of it on the rail. The conveying carriages 12 arriving at the end of the tempering furnace are guided in suitable manner from the furnace whereupon the heated panes 10 are transferred to the next operating station, for example a bending station.

The endless chain 15, which passes over two sprocket wheels 16 and 17, is driven by means of a pinion 19, joined to the sprocket wheel 17 by a shaft 18, a gear tooth system of a push rod 20 of a sliding crank drive 20, 21 being adapted to engage with the aforementioned pinion 19. The crank 21 of the sliding crank transmission is disposed on the output shaft of a wormgear transmission 22 the input shaft of which is coupled to the output shaft of a transmission 23 whose output speed is steplessly variable. The steplessly variable transmission 23 is driven by an electric motor 24, for example a three-phase, squirrel-cage brake motor. When the electric motor 24 is switched on it drives the steplessly variable transmission 23. Unless said transmission is set to an output speed of zero, said transmission drives the sliding crank transmission 21, 20 through the wormgear transmission 22, the sliding crank transmission moving the chain 15 via the pinion 19, the shaft 18 and the sprocket wheel 17 at first to the left and after a half rotation of the crank 21 once again to the right. After a complete crank rotation each chain link of the chain 15 will be once again in the position which it occupied prior to the beginning of the crank rotation. The velocity with which the chain 15 and therefore the sliding carriage 14 coupled thereto is moved may therefore be steplessly varied by appropriate adjustment of the output speed of the transmission 23.

Panes 10 heated to near the softening temperature must be conveyed in such a way that the panes cannot be excited into oscillatory or rocking movements which may result in the panes being damaged at the points where they are gripped by the tongs or dropping out of the tongs 11 and which render more difficult the bending of the panes following the heating thereof because the panes swinging to and fro must first be stopped before they can be aligned with the bending tools.

Three curve characteristics $a$, $b$ and $c$ are illustrated in FIG. 2 below the sliding carriage 14 to indicate the suitable velocity characteristics of the sliding carriage. During the conveying stroke $s$ the sliding carriage 14 is moved from the right hand starting position A in accordance with one of the curves $a$, $b$ or $c$ into the left hand limiting position. The right hand starting position A corresponds to a crank position C while the left hand limiting position B corresponds to a crank position E of the crank 21 of the sliding crank transmission.

Rocking of the panes 10 on being conveyed through the tempering furnace is substantially avoided because the velocity of the conveying carriages 12 is first steadily increased from zero and is then subsequently steadily decelerated to zero. It is also a consequency of a steady change of velocity that the associated acceleration curve has no step response position. Motional characteristics of this kind are refered to as being free of "impact" and "jerk." The motional law which is an optimum for a certain size of pane is determined most simply by experiment.

FIG. 3 shows a control arrangement by means of which the output speed of the steplessly variable transmission is varied automatically in accordance with a desired law of motion and in relation to the position of the crank 21. To this end the shaft of the crank 21 has a disc cam or cam 25 disposed on it which is connected via a double lever 26 and a linkage 27 to the adjusting element 28 of the steplessly variable transmission. At its lower end the double lever 26 is provided with a cam sensing element in the form of a roller 29 which runs on the profile of the disc cam or cam 25. The roller 29 is maintained in contact with the cam 25 by means of a spring 30. The linkage 27, which extends to the steplessly variable transmission 23, is adapted to slide in a slot 31 at the other end of the double lever 26 and is lockably pivoted within said slot. By displacement of the pivoting point in the slot 31 it is possible for the effective lever length of one lever arm of the double lever to be varied in a simple manner. Furthermore, the length of the linkage 27 which extends to the adjusting element 28 of the steplessly variable transmission 23, may be varied by a construction similar to that of a turn buckle. The angular deflection of the adjusting element 28 as well as any desired starting position may be accurately adjusted by means of said adjusting means.

Further means for adjusting the stroke s of the sliding carriage 14 and, therefore, of the conveying carriages 12 is provided on the crank 21. It will be clear that varying the effective crank length will vary the stroke s. Such a variation of the length of the crank in the present example is achieved by constructing the crank 21 in two parts. The individual sections 32 and 33 of the crank are adapted for telescoping into each other in the longitudinal direction and, after adjustment, they may be fixed relative to each other by means of clamping screws or the like. In order to ensure constant mesh of the push rod 20, having a tooth system 34, with the pinion 19, the rear side of said push rod 20 is provided with a thrust wheel 35 bearing thereon. The thrust wheel 35 is connected to the pinion 19 and pivots around the central axis thereof to enable it to adjust itself to the angular position of the push rod during one crank rotation.

Figure 4:
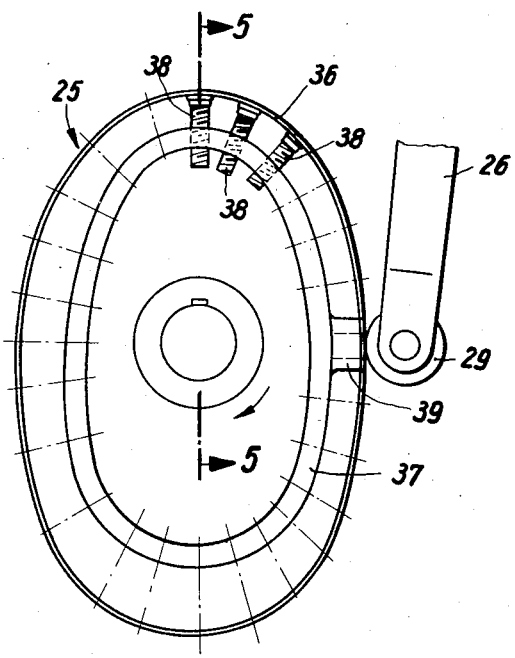
FIG. 4 is a view of a disc cam or of the cam of the control means of FIG. 3.
Figure 5:
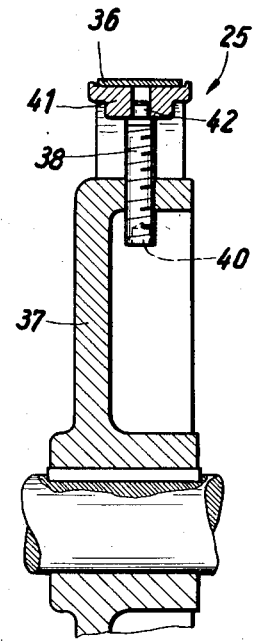
FIG. 5 is a partial section along the line V—V of FIG. 4.

The velocity characteristic of the sliding carriage 14 is defined substantially by the shape of the cam 25. FIGS. 4 and 5 show a cam 25 which permits variation of its control characteristic so that it need not be changed if any modification of the motional characteristic of the conveying carriage is required. The adjustability of the cam is obtained by virtue of the fact that the profile surface is formed by a flexible steel band 36 which is bent together to form a closed cam. Said steel band is connected to the boss 37 of the cam by means of a plurality of radially outwardly orientated adjusting screws 38 which are distributed along the circumference of the boss. The ends of the steel band are secured on a boss extension 39 of the boss 37. It is recommended that the boss 37 of the cam be given a shape which approximates the shape of the control surface of the cam so that the necessary adjustment of the control surface formed by the steel band 36 is minimized. At its inner end each adjusting screw 38 is provided with a hexagonal socket 40 which permits radial adjustment of the screws by means of a hexagonal socket key. Supporting pads 41, to support the steel band, are provided between the adjusting screws and said steel band. Each adjusting screw 38 has a pin extension 42 adapted to engage in a bore of the respective supporting pad 41 to retain such pad.

To perform a conveying step the motor 24 is set in motion. The sliding carriage 14 will then be disposed in the right hand starting position A corresponding to the crank position C. The cam 25 is shaped in such a way that it adjusts the steplessly variable transmission 23, in particular a hydraulic transmission, to a very slow output speed, that is to say a very high transmission ratio. Since the electric motor 24 does not immediately reach its full speed—for example 1,500 rev/min—when it is switched on but requires a certain period of time for running up, the output from the steplessly variable transmission will not commence in an impulsive manner but will start slowly from zero speed. Accordingly, the worm gear transmission which follows and the crank 21 of the sliding crank transmission 20, 21 disposed on the output shaft of the worm gear transmission is therefore set in motion slowly. At the same time the cam 25 is rotated and, by means of the double lever 26 and the linkage 27, regulates a progressively higher output speed of the steplessly variable transmission 23. This means that the sliding carriage 14 starts slowly from zero and is accelerated in accordance with the cam shape. Approximately when reaching the crank position D the velocity of the sliding carriage 14 is once again reduced by an appropriate shape of the control surface of the cam 25 so that the velocity is almost equal to zero immediately before reaching the crank position E. On reaching point E the conveying direction of the chain 15 is reversed and the sliding carriage 14 is retracted into the starting position A. Since this return motion is not accompanied by any displacement of the conveying carriage 12, it can be made to proceed substantially faster than the conveying stroke s if the control surface of the cam is appropriately constructed. A limit switch 21' operated by the crank 21 will then ensure that the electric motor 24 is switched off in sufficient time to enable the crank to come to a stop at the position C. The next conveying stroke s will be performed after the next conveying carriage 12 with the suspended pane is placed upon the rail 13. The conveying stroke may be triggered automatically if the electric motor 24 is switched on by the conveying carriage which has just been newly placed on the rail.

The transmission described hereinabove is of course not confined to the horizontal conveying of panes through a tempering furnace but may also be employed for the vertical lowering into the tempering furnace or for the lifting of the tempered panes from the tempering furnace. To this end it is merely necessary for the push rod of the sliding crank transmission to be connected to the conveyor for the vertical motion of the pane. In general, apparatus embodying the invention may be employed wherever it is advantegous if the material to be transported is accelerated or decelerated in accordance with a defined law of motion.

I claim:

1. In an apparatus for conveying glass panes in a shock-free manner through a treatment furnace while supporting said glass panes on carrier means intermittently movable along said furnace under the action of reciprocably mounted operating means engageable with said carrier means, a drive motor, a crank arm mounted for rotation about a fixed axis, a connecting rod pivotally connected with said crank arm, means operatively connecting said connecting rod with said reciprocable operating means, mechanism drivingly connecting said motor with said crank arm, said mechanism including an infinitely variable transmission means, cam means secured to said crank arm for rotation therewith about said fixed axis, follower means associated with said cam means, linkage means connecting said follower means with said transmission means for varying the transmission rate thereof, and a limit switch operable by said crank arm for limiting the operation of said crank arm to one complete revolution.

2. The apparatus according to claim 1, including means for varying the length of said linkage means.

3. The apparatus according to claim 1, including means for varying the length of said crank arm.

4. In an apparatus for conveying glass panes in a shock-free manner through a treatment furnace while supporting said glass panes on carrier means intermittently movable along said furnace under the action of reciprocably mounted operating means engageable with said carrier means, a drive motor, a crank arm mounted for rotation about a fixed axis, a connecting rod pivotally connected with said crank arm, means operatively connecting said connecting rod with said reciprocable operating means, mechanism drivingly connecting said motor with said crank arm, said mechanism including an infinitely variable transmission means, cam means secured to said crank arm for rotation therewith about said fixed axis, said cam means including a peripheral flexible steel band and means for varying the curvature of said steel band to thereby vary the contour of said cam means, follower means associated with said cam means, linkage means connecting said follower means with said transmission means for varying the transmission rate thereof, and a limit switch operable by said crank arm for limiting the operation of said crank arm to one complete revolution.

5. In an apparatus for conveying glass panes in a shock-free manner through a treatment furnace while supporting said glass panes on carrier means intermittently movable along said furnace under the action of reciprocably mounted operating means engageable with said carrier means, a continuously rotatable drive motor, a crank arm mounted for rotation about a fixed axis, a connecting rod pivotally connected with said crank arm, means operatively connecting said connecting rod with said reciprocable operating means and adapted to impart reciprocatory movement to said reciprocable operating means as said crank arm is rotated, mechanism drivingly connecting said motor with said crank arm, said mechanism including a transmission means infinitely variable between a minimum and a maximum transmission rate, cam means secured to said crank arm for rotation therewith about said fixed axis, follower means associated with said cam means, linkage means connecting said follower means with said transmission means, said cam means including a peripheral flexible steel band and means for varying the curvature of said steel band to thereby vary the contour of said cam means, whereby said transmission rate is varied in dependence upon the contour of said cam means to impart correspondingly varying reciprocal velocity to said reciprocably mounted operating means, and a limit switch operable by said crank arm for limiting the operation of said crank arm to one complete revolution.

* * * * *